United States Patent [19]

Kawano

[11] Patent Number: 4,684,901

[45] Date of Patent: Aug. 4, 1987

[54] AUTOMATIC PHASE CONTROL CIRCUIT

[75] Inventor: Mitsumo Kawano, Honjo, Japan

[73] Assignee: Kabushiki Kaisha Toshiba, Kawasaki, Japan

[21] Appl. No.: 908,027

[22] Filed: Sep. 16, 1986

[30] Foreign Application Priority Data

Sep. 18, 1985 [JP] Japan .................................. 60-205745

[51] Int. Cl.$^4$ ............................................... H04N 5/91
[52] U.S. Cl. ...................................... 331/25; 358/337
[58] Field of Search ............... 331/18, 25, 37; 358/24, 358/25, 337; 307/260, 262, 511, 526; 328/155

[56] References Cited

U.S. PATENT DOCUMENTS 4,539,602 9/1985 Okano .................................. 358/337
4,607,360 8/1986 Fukui .................................. 358/337

OTHER PUBLICATIONS

"National Technical Report", vol. 25, No. 1, Feb. 1979, [Video Signal Process of PAL, SECAM VTR], Auther: Chojuro Yamashita.

Primary Examiner—Eugene R. LaRoche
Assistant Examiner—Robert J. Pascal
Attorney, Agent, or Firm—Oblon, Fisher, Spivak, McClelland, & Maier

[57] ABSTRACT

An automatic phase control (APC) circuit with improved reliability of phase control, in which a phase of a reference signal from a crystal oscillator is alternately switched between two phases by a switch. The APC circuit includes a phase locked loop (PLL) for stabilizing a phase of a signal, e.g., a playback color signal of a VTR, with the phase of the reference signal, which is changed alternnately in phase between the two phases. An irregular detection (ID) circuit monitors the irregularity of the PLL. When a first monitored output of the ID circuit appears successively over two horizontal cycles, a burst ID processing for the PLL is actuated. When a second monitored output of the ID circuit follows after the first monitored output, the alternation timing of the reference signal is forcibly shifted by the switch.

9 Claims, 7 Drawing Figures

AUTOMATIC PHASE CONTROL CIRCUIT

BACKGROUND OF THE INVENTION

1. Field of the Invention

The present invention relates to an automatic phase control circuit and, more particularly, to an automatic phase control circuit for the playback section color signal frequency converter of a PAL system video tape recorders.

2. Description of the Prior Art

In video tape recorders (hereafter referred as VTR), when color signals are recorded and played back, frequency conversion of the color signal is designed to take place. For example, in the PAL system VTRs, the color signal is converted from its carrier frequency of 4.43 MHz to 626 KHz in the recording operation and restored from 626 KHz to the original 4.43 MHz in the reproducing operation. The circuit used for such frequency conversion includes an automatic phase control circuit (hereafter referred as APC circuit) for suppressing undesired phase variation of the playback color signal.

FIG. 7 shows an example of conventional frequency converters used in playback sections of the PAL system VTRs. In FIG. 7, the 626 KHz playback color signal C is mixed with the 5.056 MHz carrier signal CW by the frequency mixer 11 and converted to the 4.43 MHz color signal C. In this case, the frequency conversion output FC is phase-synchronized with a reference signal R provided from a crystal oscillator (referred as XO hereafter) 12 by a phase locked loop (refered as PLL hereafter) 10. That is to say, the phase comparator 13 in the PLL 10 compares the phases of the color burst signal CB, which is induced from the frequency conversion output FC, with the reference signal R. The result of the comparison, i.e., an error signal E between the color burst signal CB and the reference signal R is smoothed by a filter 14 and passed to a voltage controlled oscillator (referred as VCO hereafter) 15. By this means, the oscillation frequency of the VCO 15 is changed according to the filter output E of the phase comparator 13. By this frequency control, the frequency of a carrier signal CW, which is outputted from a phase shifter 16, is changed. As a result, the frequency conversion output FC is controlled so that the frequency and the phase of the color burst signal CB are synchronized with the frequency and the phase of the reference signal R.

First, suppose there is a stationary phase difference between the color burst signal CB in the playback color signal C and the reference signal R. Here, since the phase of the playback PAL system color signal C changes alternately to +45° and −45° in every horizontal cycle, the phase of the reference signal R could be explained as the mean of the above two phases.

Normally, the color burst signal CB in the playback color signal C is locked to a phase which is shifted 90° from the reference signal R. In order to monitor this locked state, the reference signal R is delayed by 90° from its original phase by a phase shifter 17. This delayed signal and the color burst signal CB are inputted to an irregular detection circuit (referred as ID circuit hereafter) 18. A detection output corresponding to the phase difference $\theta$ between those two signals is obtained as the output of a filter in the ID circuit 18. The detection output of the ID circuit 18 is set so that it is always a positive pulse for the stationary condition of the phase difference $\theta = +45°$.

If the locked condition of the PLL 10 is disturbed and, in particular, if the mean value of the phase difference $\theta$ is shifted to the vicinity of 180°, it will take time for the PLL 10 to restore the locked condition. Therefore, this shift is monitored by the ID circuit 18 and the response speed of the PLL 10 is accelerated by advancing the phase of the output of the phase shifter 16 by 90°. This kind of processing is generally called "burst ID processing".

However, since the PAL system color burst signal CB has a phase of +45° and −45° in every horizontal cycle as described above, in order to apply an automatic phase control (referred as APC hereafter) to the playback color signal C, it is necessary to increase the filtering characteristics of the filter 14 in the PLL 10. As a result, the response speed of the PLL 10 is decreased.

This kind of problem can be solved if a pair of reference signals R1 and R2 are used in place of single reference signal R, with their phases 90° apart from each other. These signals R1 and R2 are outputted alternately at every horizontal cycle. That is to say, the APC of phase O can be applied in the same way as in the NTSC system VTRs by this method.

However, this arrangement creates a problem of reliability, because if the phase alternation timing of the pair of reference signals R1(+45°) and R2(−45°) and the alternation timing of the phases (+45° and −45°) of the color burst signal CB are shifted by one horizontal cycle from each other, the PLL 10 will not stabilize the phases.

SUMMARY OF THE INVENTION

Accordingly, an object of the present invention is to provide an automatic phase control (APC) circuit devised to counter the problems of the conventional APC circuit.

Another object of the present invention is to improve the reliability of phase control in an APC circuit.

A further object of the present invention is to provide an APC circuit suitable for the playback section color signal frequency converter for PAL system VTRs.

Another object of the present invention is to improve the reliability of phase control in an APC circuit in which a phase of a reference signal is alternately switched between two phases.

In order to achieve the above objects, the APC circuit according to the present invention includes a phase locked loop (PLL) for stabilizing a phase of a signal, e.g., a playback color signal of a VTR, with the phase of the reference signal, which is changed alternately in phase between the two phases. An irregular detection (ID) circuit monitors the irregularity of the PLL. When a first monitored output of the ID circuit appears successively over two horizontal cycles, a burst ID processing for the PLL is actuated. When a second monitored output of the ID circuit follows after the first monitored output, the alternation timing of the reference signal is forcibly shifted by the switch.

DESCRIPTION OF THE PREFERRED EMBODIMENTS

The present invention will now be described in detail with reference to the accompanying drawings, namely, FIGS. 1 to 6. Throughout the drawings, like reference nummerals and letters are used to designate elements like or equivalent to those used in FIG. 7 (Prior Art Circuit) for the sake of simplicity of explanation.

Figure 1:
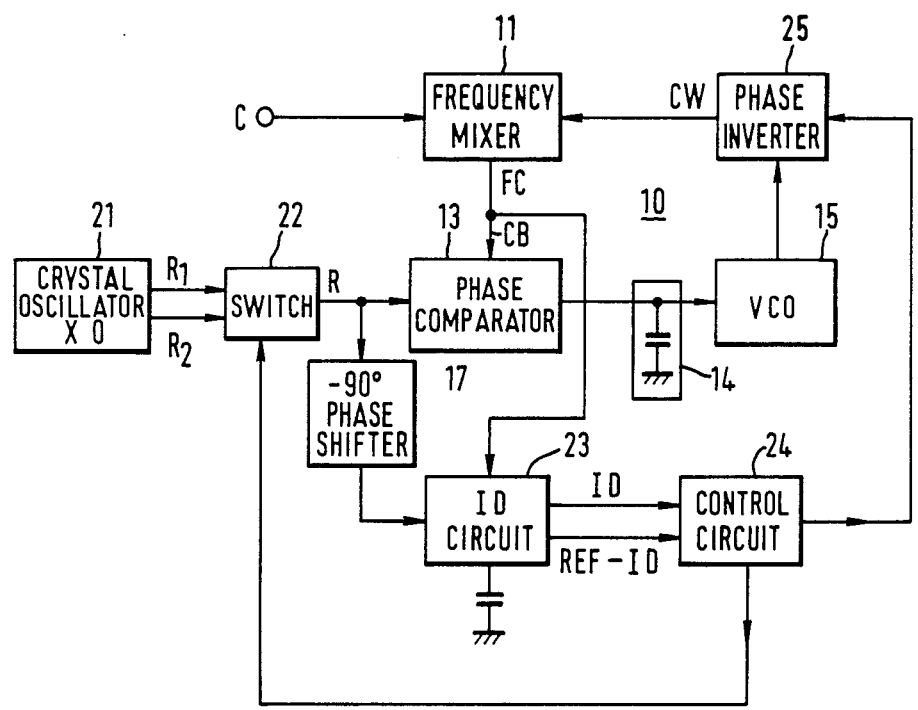
FIG. 1 is a block diagram showing an embodiment of the playback section frequency converter for PAL system VTRs according to the present invention.

FIG. 1 is a block diagram showing an embodiment of the playback color signal frequency converter of a PAL system VTR, which is provided with an automatic phase control (APC) circuit according to the present invention. In FIG. 1, a 626 KHz playback color signal C is applied to an input terminal of a frequency mixer 11. The frequency mixer 11 mixes the 626 KHz playback color signal C with a 5.056 MHz carrier signal CW applied to another input terminal of the frequency mixer 11 from a voltage controlled oscillator (VCO) 15 through a phase inverter 25. The frequency mixer 11 converts the frequency of the input color signal C to 4.43 MHz. The 4.43 MHz color signal C is outputted from an output terminal of the frequency mixer 11 as a frequency conversion output FC and is applied to an input of a phase comparator 13. The phase comparator 13 includes a phase locked loop (PLL) 10 together with a low pass filter 14, the VCO 15, the phase inverter 25 and the frequency mixer 11. In the phase comparator 13, a color burst signal component CB in the phase of the frequency conversion output FC is compared with a reference signal R applied to another input terminal of the phase comparator 13. A phase error signal E resulting from the phase comparison between the color burst signal CB and the reference signal R is applied to the VCO 15 after being smoothed by the low pass filter 14. Then the VCO 15 is varied to the base oscillation frequency, 5.056 MHz, under the control of the smoothed phase error signal E. The output of the VCO 15 is applied to the other input of the frequency mixer 11 through the phase inverter 25 as the carrier signal CW, as mentioned above. The phase inverter 25, however, passes the output of the VCO 15 while inverting or not inverting a phase of the output of the VCO 15, as described later.

In the PLL 10, the reference signal R applied to the phase comparator 13 has a stable phase. Therefore, the phase of the color burst signal CB and also the phase of the frequency conversion output FC, which generally fluctuate due to fluctuations of the tape transportation in the recording/playback operation, are forcibly locked to the phase of the reference signal R by the APC control of the PLL 10. Then the phase of the frequency conversion output FC is stabilized.

The XO 21 actually generates two reference signals R1 and R2 which are same in frequency, but differ in phase by 90° from each other. The reference signals R1 and R2 are selected by a switch 22 alternately in every horizontal cycle. The selected signal (represented by the reference signal R) is applied to the phase comparator 13. In normal condition, the phase of the reference signal R in every horizontal cycle changes in accordance with the phase change of the color burst signal CB.

The reference signal R is routed through a −90° phase shifter 17. The resulting signal and the color burst signal CB are applied to an irregular detection (ID) circuit 23, which monitors the irregularity of the phase relationship between the color burst signal CB and the reference signal R. The ID circuit 23 operates as follows. The ID circuit 23 successively produces a positive pulse in every horizontal cycle when the phases of the color burst signal CB and the reference signal R are in the normal condition wherein the phase difference between the phases is less than 90°. The ID circuit 23 successively produces a negative pulse when the phases of the color burst signal CB and the reference signal R are in an abnormal condition, e.g., a condition that the one phase is shifted more than 90° from the other phase. Further, the ID circuit 23 produces both positive and negative pulses alternately in every horizontal cycle when the phase alternation timing of the color burst signal CB and the reference signal R are shifted by one horizontal cycle from each other, e.g., when the color burst signal CB of the order of (2n+1)H (here, n represents an integer, H represents one horizontal cycle) is advanced 90 from the prior one, i.e., the color burst signal CB of the order of 2nH and the reference signal R of the order of (2n+1)H is delayed 90 from the prior signal, i.e., the reference signal R of the order of 2nH.

The positive and the negative pulses are outputted from separated output terminals of the ID circuit 23 as signals ID and REF-ID both in the form of positive pulses, respectively. An error control circuit 24, which receives these two pulses ID and REF-ID, controls the phase inverter 25 and the switch 22 according to the pulses, ID and REF-ID, as described below. That is, the error control circuit 24 controls the phase inverter 25 so that the phase inverter 25 inverts the phase of the output signal of the VCO 15 when two ID pulses are successively applied to the error control circuit 24 (referred to as "burst ID processing"). The error control circuit 24 controls the switch 22 so that the switch 22 shifts the phase alternation timing of the reference signals R1 and R2 when the pulses ID and REF-ID are alternately applied to the error control circuit 24. As a result, the phase relationship between the color burst signal CB and the reference signal R is restored to the normal condition.

Figure 2:
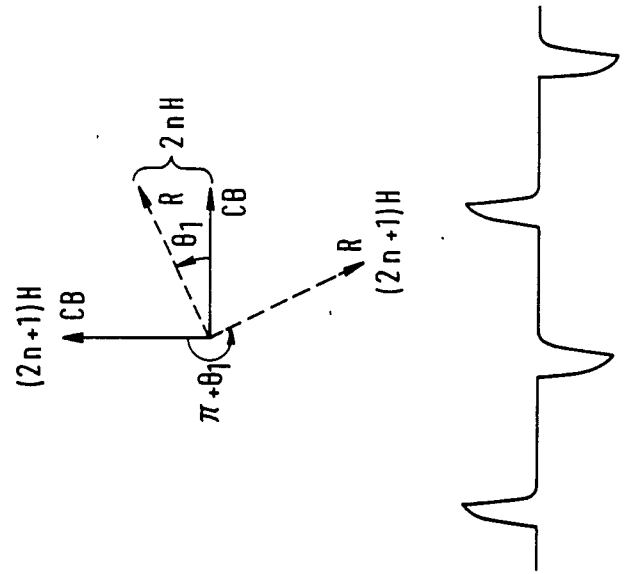
FIGS. 2 and 3 are graphs for illustrating the operation of the APC circuit of FIG. 1.

The operation of the ID circuit 23 will be described in more detail with references to FIGS. 2 and 3. First, as shown in FIG. 2, when the color burst signal CB of the order of (2n+1)H and the selected reference signal R at that time are both advanced by 90° from the signals of the prior horizontal cycle, that is, the color burst signal CB of the order of 2nH and the reference signal R on the order of 2nH, (the condition is taken as of the normal polarity condition), the phase difference $\theta$ between the color burst signal CB and the reference signal R is the same at both horizontal cycles of the orders of 2nh and (2n+1)H and the phase difference $\theta$ is maintained below 90° ($\pi/2$). In this condition, the ID circuit 23 outputs a pulse of one polarity, e.g., a positive pulse when the absolute value of the phase difference $\theta$ is below $\pi/2$ (i.e., $|\theta|<\pi/2$)S. The ID circuit 23 outputs a pulse of the other polarity, e.g., a negative pulse when the absolute value of the phase difference $\theta$ is between $\pi/2$ and $\pi$ ($\pi/2<|\theta|<\pi$). Therefore, the ID circuit 23 successively outputs the positive pulse in every horizontal cycle at the above condition.

Figure 3:
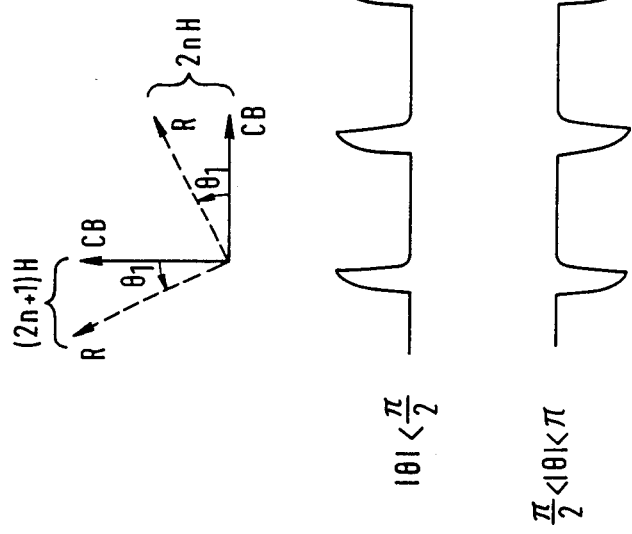

Moreover, as shown in FIG. 3, when the color burst signal CB of the order of (2n+1)H is advanced 90° in relation to the prior signal, i.e., the color burst signal CB of the order of 2nH and the reference signal R of the order of (2n+1)H is delayed 90° from the prior signal, i.e., the reference signal R of the order of 2nH, (the condition is taken as of the abnormal polarity condition), the phase difference $\theta$ between the color burst signal CB and the reference signal R at the order of (2n+1)H exceeds 90°.

Therefore, the ID circuit 23 alternately outputs the positive pulse at the 2nH horizontal cycles and the negative pulse at the (2n+1)H horizontal cycles.

Figure 4:
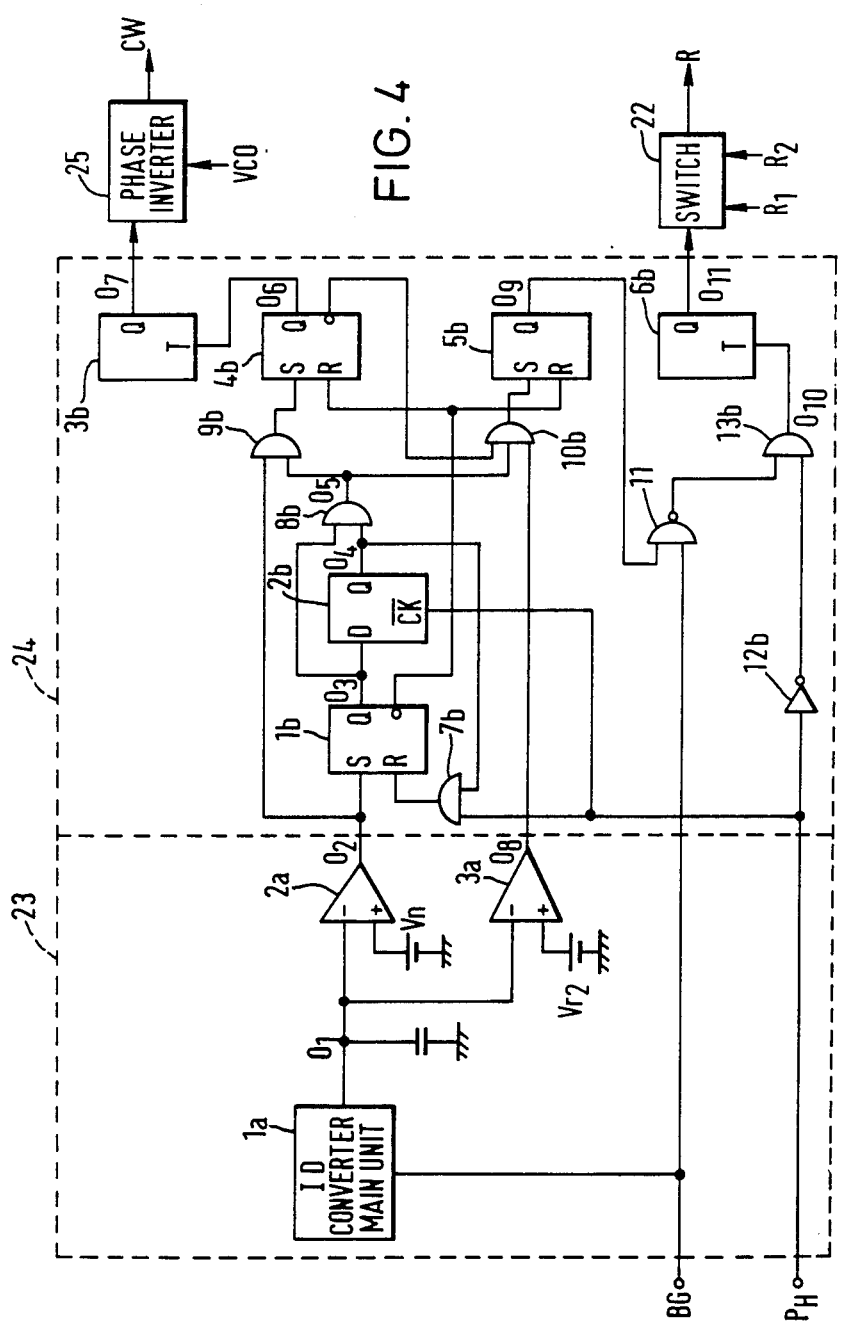
FIG. 4 is a circuit diagram showing an example of the main parts of the automatic phase control (APC) circuit of FIG. 1 in more detail.

FIG. 4 is a circuit diagram showing an example of the actual construction of the ID circuit 23 and the error control circuit 24. The operations of the ID circuit 23 and the error control circuit 24 shown in FIG. 4 are described in further detail below with reference to the timing charts shown in FIGS. 5 and 6.

First, when the reference signal R is switched correctly in relation to the phase alternation of the color burst signal CB (i.e., $|\theta| < \pi/2$), the PLL 10 is locked normally. Because a main unit 1a of the ID circuit 23 outputs a positive pulse as its filter output 01. Outputs 02 and 08 of comparators 2a and 3a are at a low ("L") level. The inverted inputs of comparators 2a and 3a are connected to the ID circuit main unit 1a, and their non-inverted inputs are separately connected to sources of reference voltages Vr1 and Vr2. Moreover, an SR shift register 1b has its set input terminal (hereafter referred as S terminal) connected to the output terminal of the comparator 2a. The output 03 of the shift resistor 1b is at "L" level (reset condition). Outputs 06 and 09 of SR shift registers 4b and 5b are also at "L" level. The S terminals of the SR shift registers 4b and 5b are connected to the output terminals of the comparators 2a and 3a through AND gates 9b and 10b, respectively. Furthermore, an output 04 of a D flipflop circuit 2b is at "L" level. The data input terminal (hereafter referred as D terminal) of the D flipflop circuit 2b is connected to the Q output terminal of the SR shift register 1b. Output 07 of a T flipflop circuit 3b is either the "L" level or a high ("H") level and is in the stable condition. The T input terminal of the T flipflop circuit 3b is connected to the Q output terminal of the SR shift register 4b. A T flipflop circuit 6b is connected at its T input terminal to an input terminal for receiving pulse PH with the horizontal frequency fH through an inverter 12b and an AND gate 13b, so that the T flipflop circuit 6b devides the frequency of the pulse PH by 2 and then outputs an output 011 of ½fH frequency for controlling the switch 22.

Figure 5:
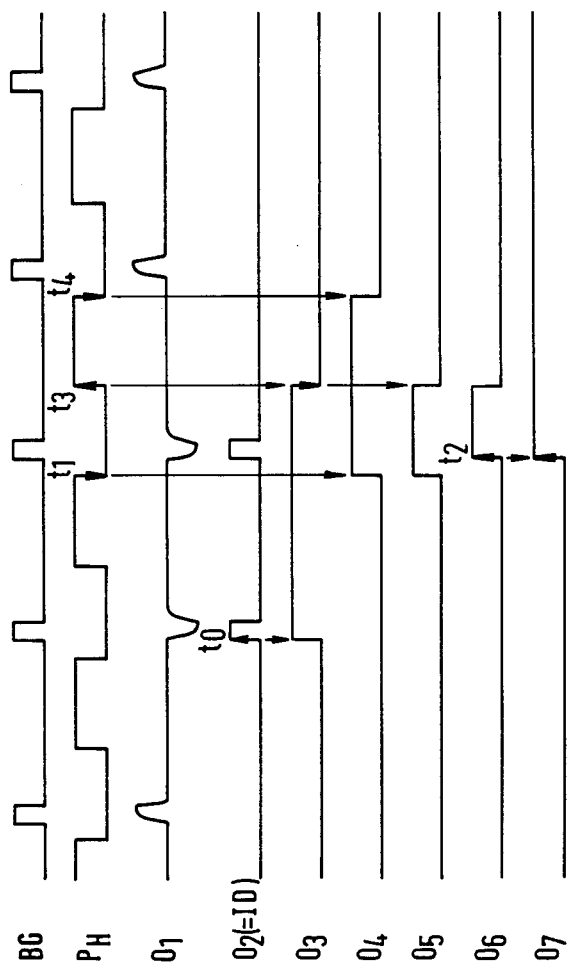
FIGS. 5 and 6 are timing charts for illustrating the operation of the APC circuit of FIG. 4.

Incidentally, a color burst gate pulse BG, which gates the color burst signal CB, and the pulse PH of the horizontal frequency fH are outputted with the timing shown in FIG. 5.

Next, when the phase of the playback color signal C has been shifted 180, the filter output 01 of the ID circuit 23 becomes a negative pulse and the pulse 02 is outputted as a first monitored output ID of a positive pulse from the comparator 2a (a time t0 in FIG. 5). The SR flipflop circuit 1b is set and its output 03 turns to the "H" level by this action. Furthermore, the output 04 of the D flipflop circuit 2b changes to the "H" level at a time t1 of the next trailing end of the pulse PH. By this means, the AND gate 7b is opened and the SR flipflop circuit 1b is reset at a time t3 of the next leading end of the pulse PH. Therefore, the output 04 of the flipflop 2b also changes to the "L" level at a time t4 of the next trailing end of the pulse PH.

An output 05 of an AND gate 8b changes to the "H" level only when either of the Q output 03 of the SR flipflop circuit 1b or the Q output 04 of the D flipflop circuit 2b is the "H" level. The two inputs of the AND gate 8b are connected to the Q output terminals of the SR flipflop circuit 1b and the D flipflop circuit 2b, respectively. Thus, an AND gate 9b gates open only during the period between the times t1 and t3 when the outputs 03 and 04 of the SR flipflop circuit 1b and the D flipflop circuit 2b are the "H" level together. Therefore, when the second pulse ID appears on the output terminal of the comparator 2a at a time t2 of this period, the second pulse ID passes through the AND gate 9b and sets the SR flipflop circuit 4b. The Q output 07 of the T flipflop circuit 3b is inverted at the time t2 of the leading end of the output 06 of the SR flipflop circuit 4b. By this means, a phase inversion of the carrier signal CW is performed by the phase inverter 25, and the PLL 10 accelerates its response characteristics.

Incidentally, the SR flipflop circuit 4b is restored to the former reset state in following the resetting of the SR flipflop circuit 1b, and its output 06 is restored to the "L" level.

Figure 6:
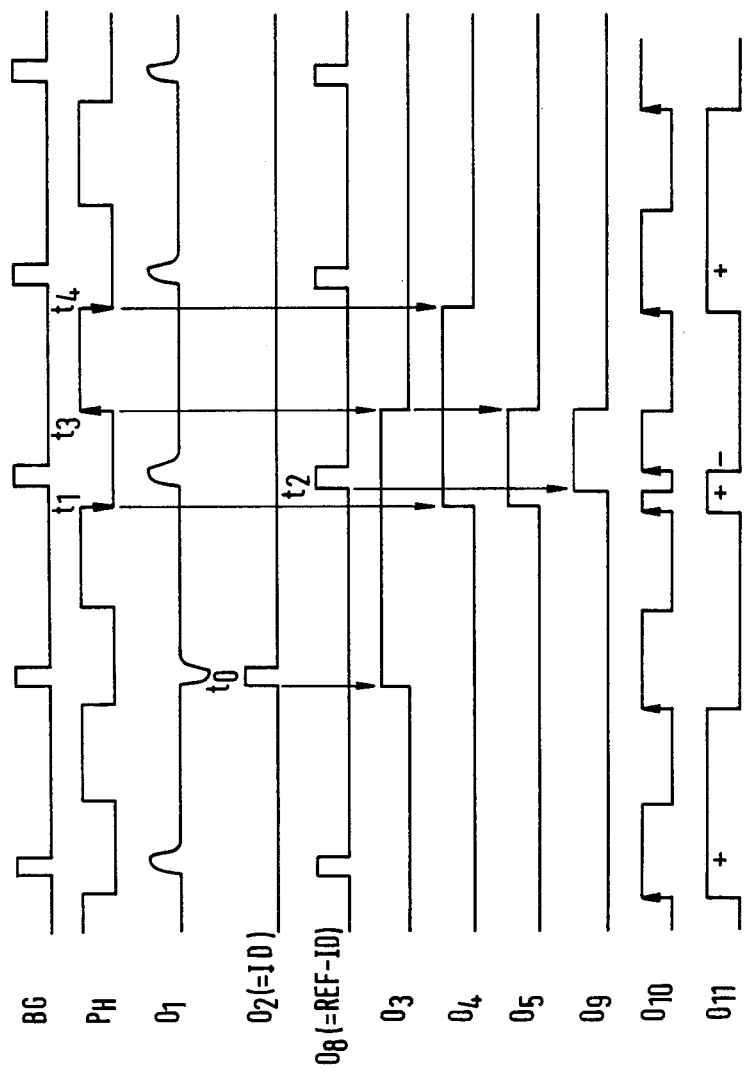
Figure 7:
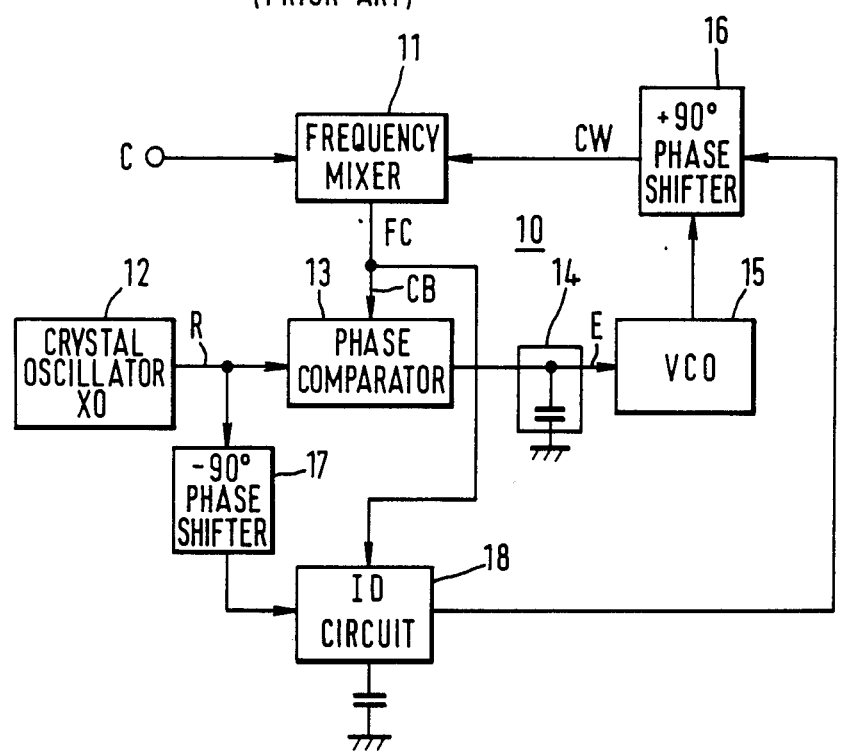
FIG. 7 is a block diagram showing a conventional playback section frequency converter for PAL system VTRs.

Next, when the polarities of the reference signal R and the color burst signal CB are reversed. First, as shown in FIG. 6, the filter output 01 of the ID circuit 23 becomes a negative pulse (the time t0) and the pulse ID is outputted from the comparator 2a. By this means, in the same way as in the previous FIG. 5, the output 05 of the AND gate 8b changes to the "H" level only during the period from the time t2 to the time t3 in which the color burst signal CB of next horizontal cycle is included.

After this, the filter output 01 of the ID circuit 23 changes to a positive pulse and a pulse 08 is outputted as a second monitored output REF-ID of positive pulse from the comparator 3a. The second monitored output 08 (REF-ID) passes through an AND gate 10b and sets the SR flipflop circuit 5b. Then the SR flipflop circuit 5b is reset in following the resetting of the SR flipflop circuit 1b. The output 09 of the SR flipflop 5b is applied to the NAND logic processing with the color burst gate pulse BG in the NAND gate 11b. Further, the AND logic processing of the NAND output and the output PH of the inverter 12b is accomplished by the AND gate 13b. This causes the input T to the T flipflop circuit 6b or the output 010 of the AND gate 13b to have two pulses during the period from the time t1 to the time t3, as shown in FIG. 6. Therefore, the Q output 011 of the T flipflop 6b is forcibly changed from one level to the other during the period. In other words, the timing of the output 011 of the T flipflop circuit 6b is shifted by just one horizontal cycle. By this means, the polarity of the reference signal R is inverted and changes to the same polarity as the color burst signal CB.

The present invention may be easily modified without being limited to the above described embodiment. For instance, when the pulse ID is outputted continuously, the phase of the reference signal R may be inverted instead of inverting the phase of the carrier signal CW.

Moreover, this invention can also be applied to APC circuits other than frequency conversion circuits for VTRs.

As described above, the present invention is able to provide APC circuits with a high reliability of phase control.

What is claimed is:

1. An automatic phase control circuit comprising:
   a signal input circuit for receiving an input signal which changes its phase alternately between first and second phases with a predetermined input cycle;
   means for generating a reference signal which changes its phase alternately between third and fourth phases with a reference cycle of predetermined alternation timing;
   a phase locked loop for locking the first and second phases of said input signal into the corresponding third and fourth phases of said reference signal, respectively;
   means for monitoring in every said input cycle whether a phase error of a predetermined range exists between said input signal and said reference signal, said monitoring means including an irregular detection circuit for producing a first monitored output when said phase error is out of the predetermined range, and a second monitored output when said phase error is within the predetermined range, and an error control circuit for shifting the alternation timing of said third and fourth phases, when said second monitored output follows said first monitored output from said irregular detection circuit.

2. An automatic phase control circuit according to claim 1, wherein said input signal is a playback color signal of a video tape recorder and said predetermined input cycle is a horizontal cycle.

3. An automatic phase control circuit according to claim 2, wherein said video tape recorder is a PAL system video tape recorder.

4. An automatic phase control circuit according to claim 1, also including a phase shifter for shifting the reference signal.

5. An automatic phase control circuit according to claim 4, wherein said phase locked loop includes a voltage controlled oscillator for producing an oscillation signal and a phase inverter responsive to said monitoring means for inverting a phase of the oscillation signal.

6. An automatic phase control circuit according to claim 5, wherein said error control circuit includes means for controlling said phase inverter for inverting the phase of the oscillation signal when at least two first monitored outputs are successively produced by said irregular detection circuit.

7. An automatic phase control circuit according to claim 1, wherein said reference signal generating means includes an oscillator for generating two oscillation signals which have the third and fourth phases, respectively, and a switch for selecting said two oscillation signals alternately with said predetermined reference cycle, and wherein said switch is responsive to said error control circuit for shifting the alternation timing of said two oscillation signals.

8. An automatic phase control circuit according to claim 7, wherein said input signal is a playback color signal of a video tape recorder and said predetermined cycle is a horizontal cycle.

9. An automatic phase control circuit according to claim 8, wherein said video tape recorder is a PAL system video tape recorder.

* * * * *